US012194908B2

(12) United States Patent
Kreidler et al.

(10) Patent No.: US 12,194,908 B2
(45) Date of Patent: Jan. 14, 2025

(54) RATCHETING CHAIN BINDER

(71) Applicant: J.J. Keller & Associates, Inc., Neenah, WI (US)

(72) Inventors: Jason Jon Kreidler, Sheboygan, WI (US); Kevin Roger Kucksdorf, Hortonville, WI (US)

(73) Assignee: J.J. Keller & Associates, Inc., Neenah, WI (US)

( * ) Notice: Subject to any disclaimer, the term of this patent is extended or adjusted under 35 U.S.C. 154(b) by 764 days.

(21) Appl. No.: 17/500,021

(22) Filed: Oct. 13, 2021

(65) Prior Publication Data

US 2023/0114302 A1 Apr. 13, 2023

(51) Int. Cl.
*B60P 7/00* (2006.01)
*B60P 7/08* (2006.01)

(52) U.S. Cl.
CPC .................................... *B60P 7/083* (2013.01)

(58) Field of Classification Search
CPC ................................ B60P 7/083; F16G 11/12
See application file for complete search history.

(56) References Cited

U.S. PATENT DOCUMENTS

| | | | |
|---|---|---|---|
| 3,338,359 | A | 8/1967 | Baillie et al. |
| 3,462,137 | A | 8/1969 | Grube |
| 4,130,269 | A | 12/1978 | Schreyer |
| 7,055,804 | B2 | 6/2006 | Scott |
| 7,862,270 | B1 | 1/2011 | Roberts et al. |
| 8,851,255 | B2 | 10/2014 | Mitchell |
| 9,453,557 | B2 | 9/2016 | Chou |
| D772,032 | S | 11/2016 | Durbin |
| 10,029,604 | B2 | 7/2018 | Brewster et al. |
| 10,239,437 | B2 | 3/2019 | Thompson |
| 10,239,439 | B2 | 3/2019 | Cooper |
| 10,384,591 | B2 | 8/2019 | Chao et al. |
| 10,464,467 | B2 | 11/2019 | Robins |
| 10,752,156 | B2 | 8/2020 | Ruan et al. |
| D915,850 | S | 4/2021 | Durbin |
| D917,252 | S | 4/2021 | Durbin |
| D917,253 | S | 4/2021 | Durbin |
| 2014/0109361 | A1 | 4/2014 | Helline |
| 2014/0326935 | A1 | 11/2014 | Chao |
| 2018/0298986 | A1 | 10/2018 | Rolof |
| 2019/0186595 | A1 | 6/2019 | Agarwalla et al. |
| 2020/0262331 | A1 | 8/2020 | Loraine |
| 2020/0362942 | A1 | 11/2020 | Martens |
| 2021/0101518 | A1 | 4/2021 | Helline |
| 2021/0122287 | A1 | 4/2021 | Mollick |

FOREIGN PATENT DOCUMENTS

| | | | |
|---|---|---|---|
| DE | 202020104814 | U1 | 10/2020 |
| DE | 202020104941 | U1 | 10/2020 |

*Primary Examiner* — Steven O Douglas
(74) *Attorney, Agent, or Firm* — Wong Meyer Smith & McConnell

(57) ABSTRACT

A ratcheting chain binder including a mechanical release to allowing the body to be freely moveable up to a fully extended position.

20 Claims, 10 Drawing Sheets

22 10 20 19 14 26 28 12 24 18 18 36 38 30 34 32 16 19 20 22 40

RATCHETING CHAIN BINDER

FIELD OF THE INVENTION

The present subject matter relates to ratcheting chain binders to secure loads.

BACKGROUND OF THE INVENTION

Ratcheting chain binders are well known in the art for securing loads. Also called a load binder, ratcheting chain binders are a device to tighten a chain when securing a load for transport using a ratcheting action to create tension. A ratcheting chain binder uses two chain hooks connected together with a rotatable threaded body. The hooks are turned to their most extended positions by turning the body, then the hooks are attached to a chain and a handle is used to provide leverage to thread the hooks inward to eliminate any slack in the chain and provide tension to the chain for securing a load. The process of rotating the hooks manually when there is no load is time consuming. The popular method employed to solve this time consuming problem is to provide a way to use a battery powered drill to quickly take up slack or fully extend the hooks, both of which requires a second tool to be carried.

SUMMARY OF THE INVENTION

In one construction, the disclosure provides a ratcheting chain binder comprising an axially rotatable body having two ends and threads thereon, a hook secured to each end of the body, a ratcheting handle for providing a ratcheting action and a thread release having teeth and having a first position wherein the teeth engage the threads to prevent axial motion of the body and a second position wherein the teeth do not engage the threads to allow axial motion of the body.

In another construction, the disclosure provides a ratcheting chain binder comprising an axially rotatable body having two ends and threads thereon, a hook secured to each end of the body, a ratcheting handle for providing a ratcheting action and a thread release having teeth and having a first position wherein the teeth engage the threads to prevent axial motion of the body and a second position wherein the teeth do not engage the threads to allow axial motion of the body.

In another construction, the disclosure provides a ratcheting chain binder comprising an axially rotatable body having two ends and threads therebetween, a chain extending from each end of the body, a hook extending from each chain, a ratcheting handle for providing a ratcheting action having a use position and a storage position and a lever pivotably secured to the body and having thereon teeth and a user pad, the user pad adapted to be depressible by a user to move the lever from a first position wherein the teeth engage the threads and prevent axial motion of the body to a second position wherein the teeth do not engage the threads allowing axial motion of the body to another position.

Other aspects of the disclosure will become apparent by consideration of the detailed description and accompanying drawings.

DETAILED DESCRIPTION

Figure 1:
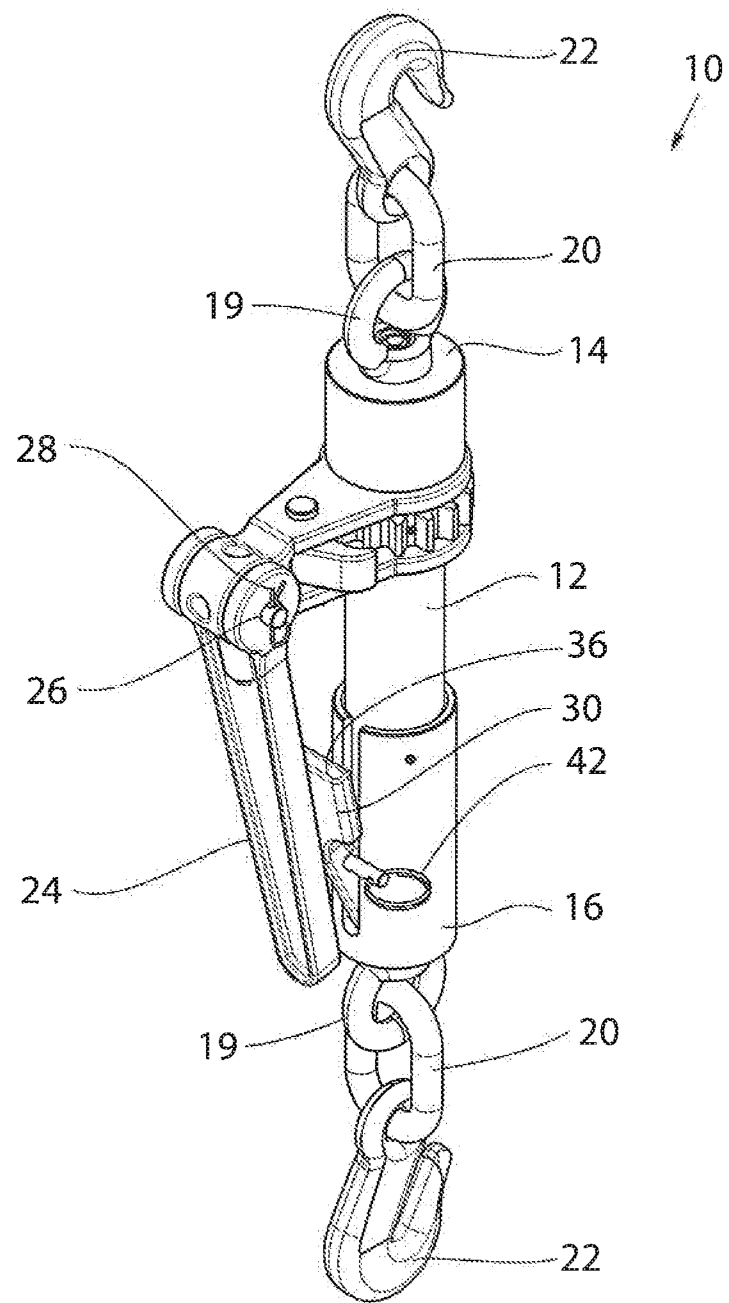
FIG. 1 is a perspective view of a ratcheting chain binder.
Figure 2:
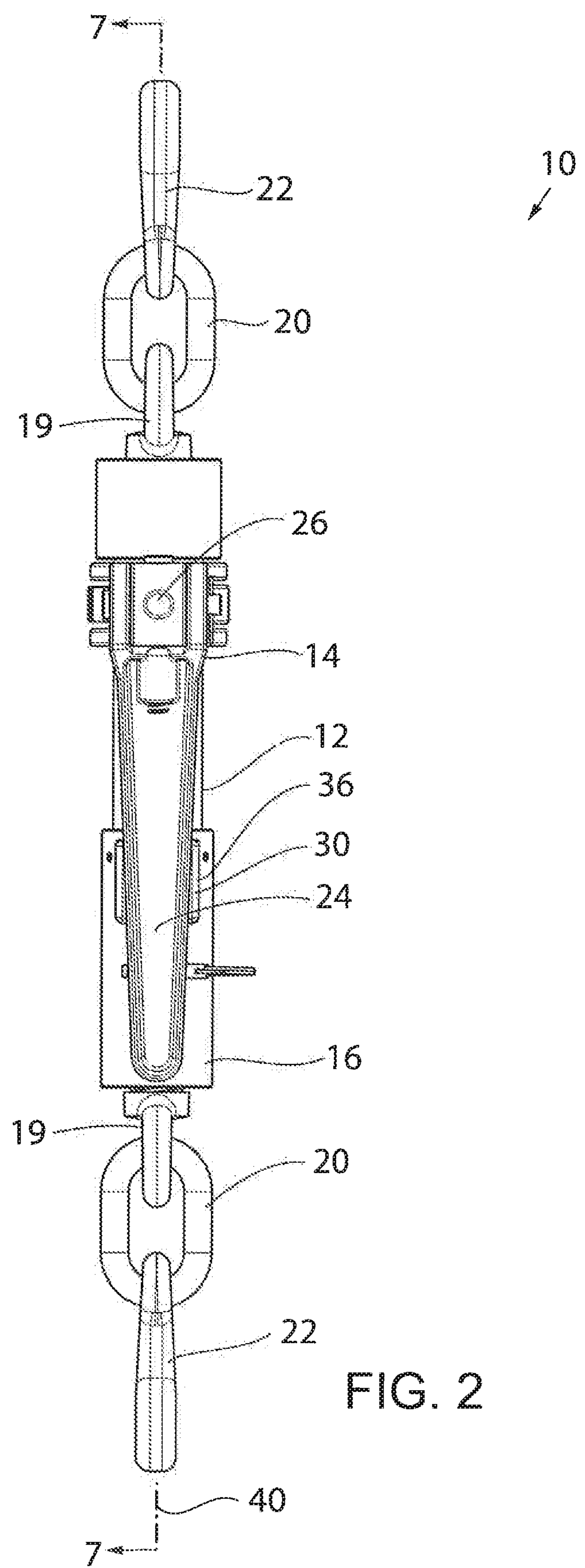
FIG. 2 is a top view of the ratcheting chain binder.
Figure 3:
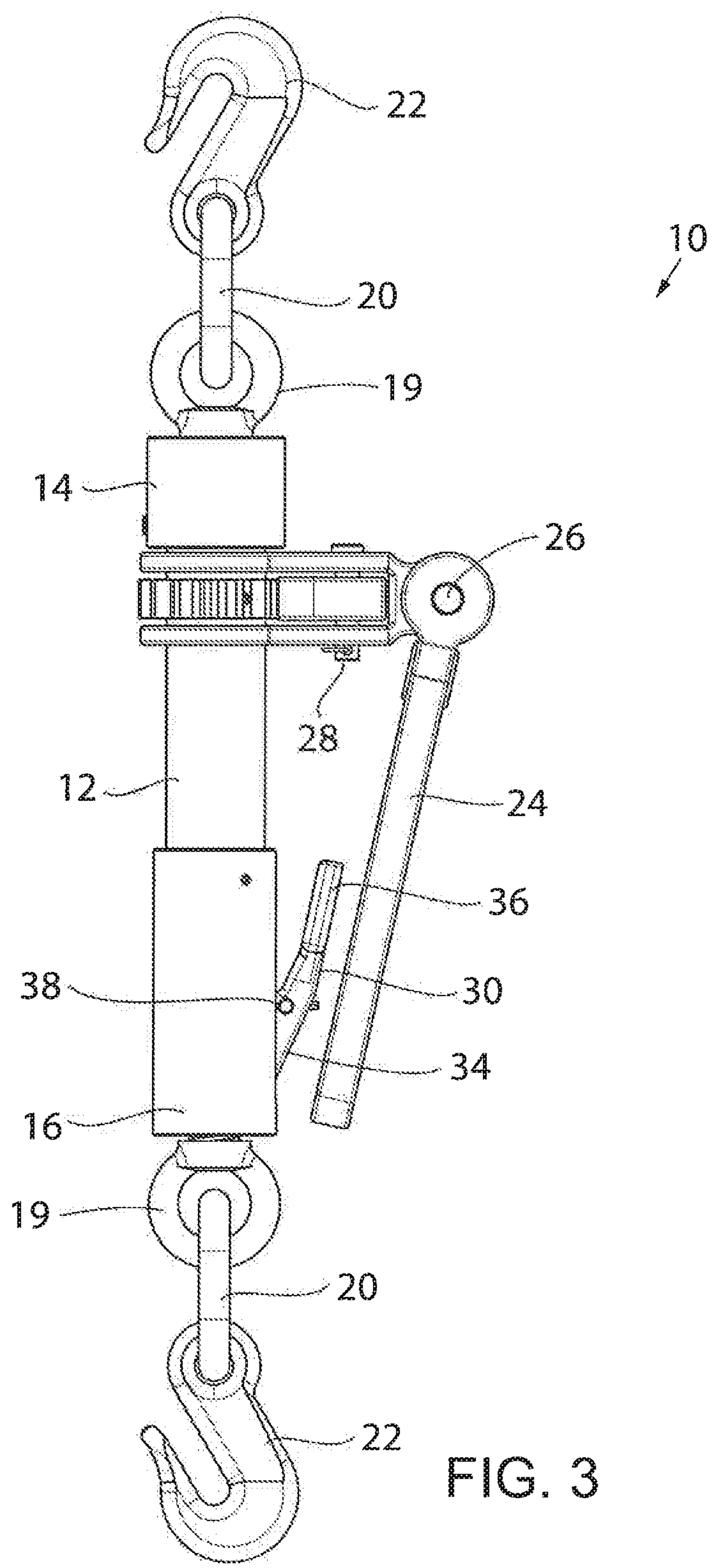
FIG. 3 is a side view of the ratcheting chain binder.
Figure 4:
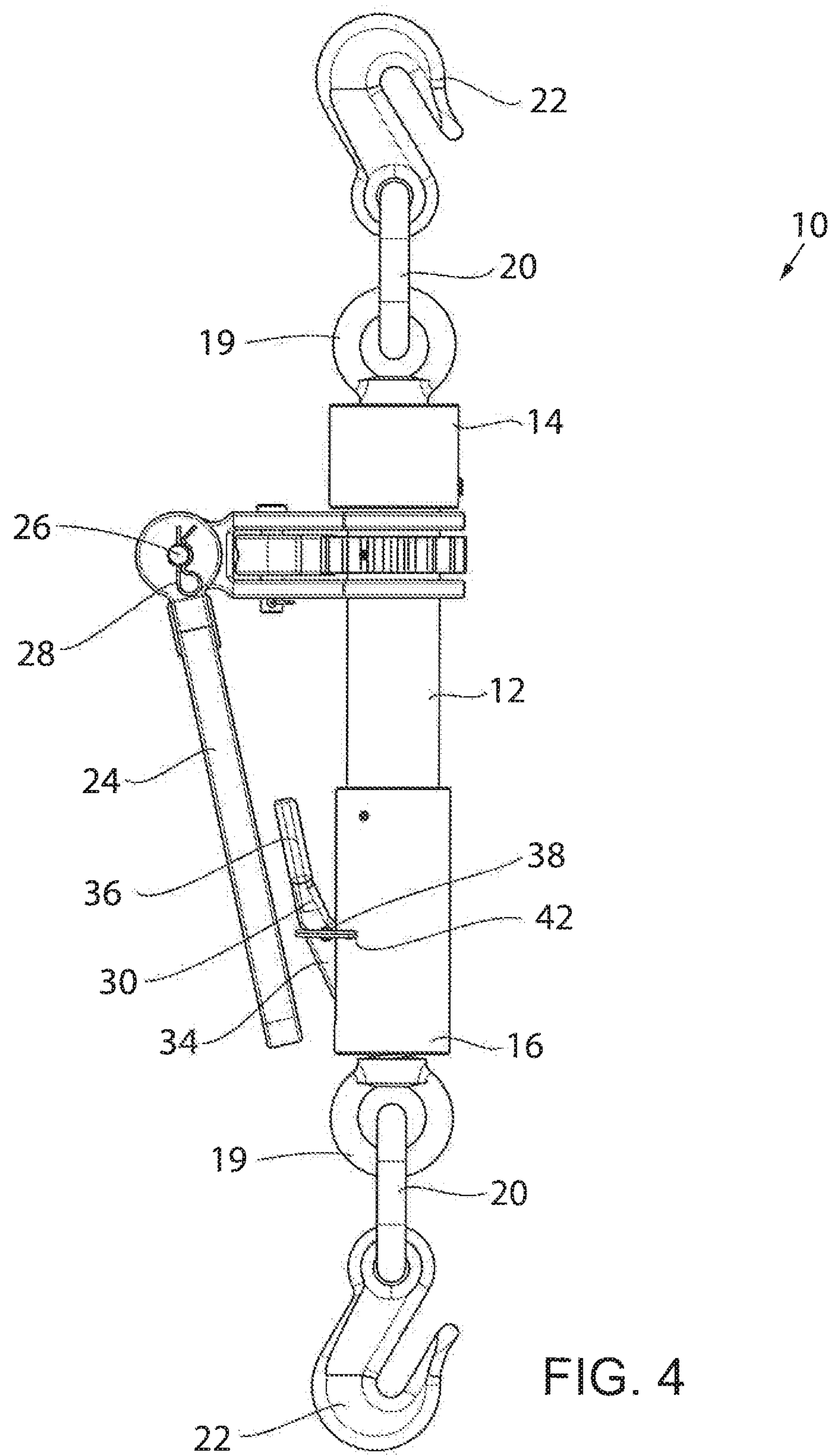
FIG. 4 is a side view of the ratcheting chain binder.
Figure 5:
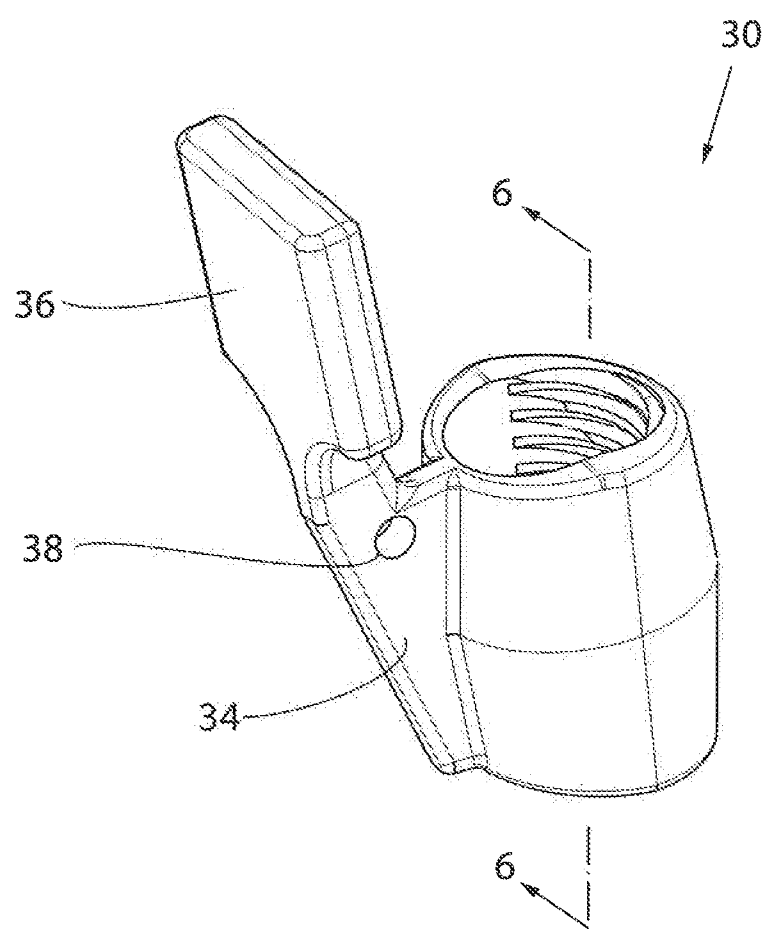
FIG. 5 perspective view of a lever.
Figure 6:
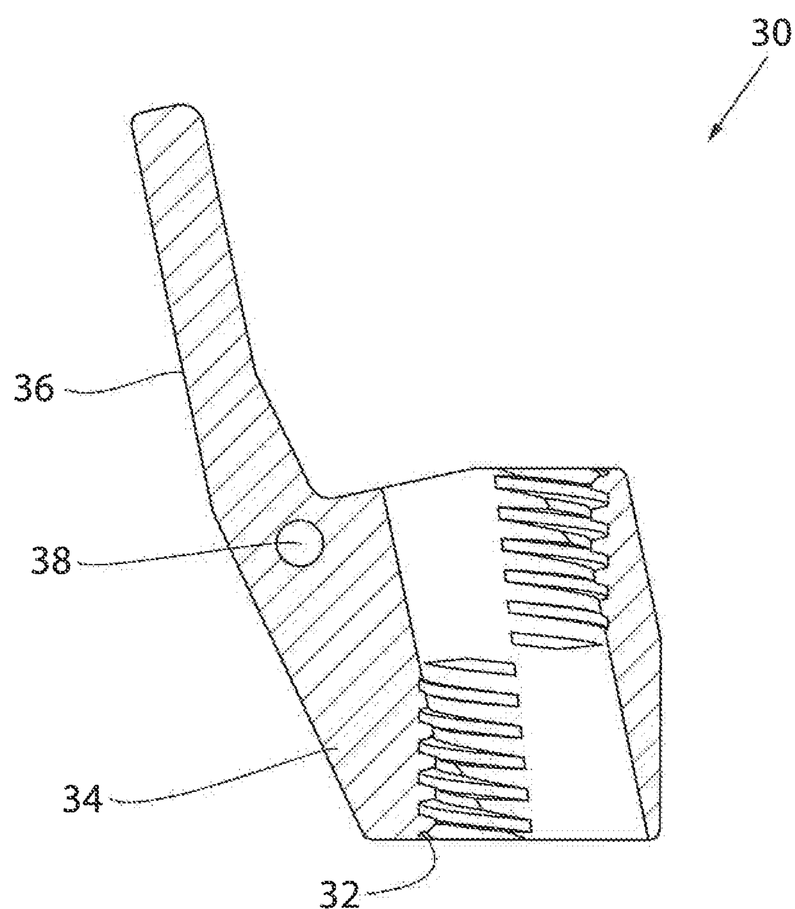
FIG. 6 is a sectional view of the level taken along line A-A of FIG. 5.

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

FIGS. 1-4 illustrate a ratcheting chain binder 10 in accordance with the present disclosure. The binder 10 includes a rotatable body 12 having two ends 14, 16 and having threads 18 thereon, an eye 19 extending from each end 14, 16, a chain 20 extending from each eye 19 and a hook 22 secured to each chain 20, as are known in the art, however, other arrangements of elements can be utilized. A ratcheting handle 24 is rotatably attached to the body 12 to provide leverage to thread the hooks inward to eliminate any slack in the chain as is known in the art. Preferably, the ratcheting handle 24 is movable between a storage position (FIG. 1) and a use position (FIG. 10), such as by pivoting about a pivot point 26 for example. The ratcheting handle 24 can be secured in the storage position such as with the use of lock such as cotter pin 28, however, other methods can also be utilized. The ratcheting handle 24 is preferably positioned toward one end 14 of the body 12.

The binder 10 further includes mechanical thread release such as the lever 30 shown in FIGS. 1-6. It should be noted, however, that the release 30 could include other types of mechanical releases such as a button, slide, or the like. The body 12 is configured to allow the threads 18 to be released via the release 30 and thus freely move up to its fully extended position. The lever 30 includes teeth 32 that engage the threads 18 on the body 12, an engagement portion 34 and a user pad 36. It should be noted that the lever 30 can be configured in other configurations. The lever 30 is pivotably attached to the body 12 at a pivot point 38 and includes a first position wherein the teeth 32 engage the threads 18 thus not allowing longitudinal motion of the body along the axis 40. Preferably, the lever 30 is biased in this first position and preferably, when there is a load on the binder, the lever 30 cannot be moved to the second position. Upon a user depressing the pad 36, the teeth 32 disengage from the threads 18 and the body 12 is freely moveable along the axis 40 and preferably moveable to its fully extended position. The release thus provides a mechanical way to freely extend the hook 22 up to the most extended position before taking up slack in the chain 20 with the handle 24 to provide the needed tension to secure a load. This allows the hook 22 to slide freely along the axis 40 to the most advantageous position before reengaging the threads 18 to allow the body 12 to be rotated via the ratcheting handle 24 to create the needed tension to secure a load.

Optionally, a lock can be utilized to prevent the lever 30 from being pressed accidentally during use of the binder 10. For example, the lock can include a cotter pin 42 to prevent the lever 30 from pivoting as shown in the drawings. However, it should be noted that other locks can also be utilized.

Figure 7:
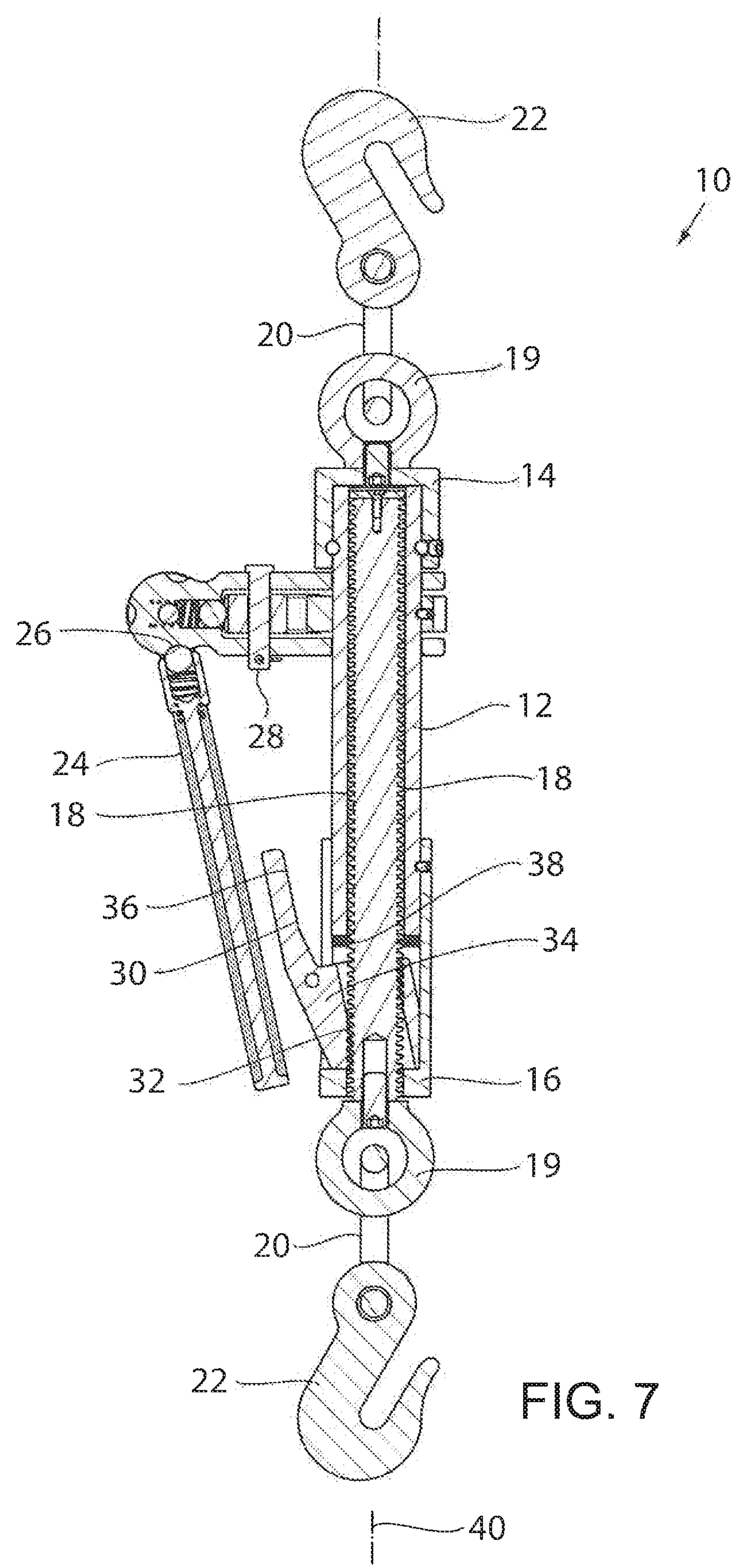
FIG. 7 is a sectional view taken along line B-B of FIG. 1 with the lever in a first position.
Figure 8:
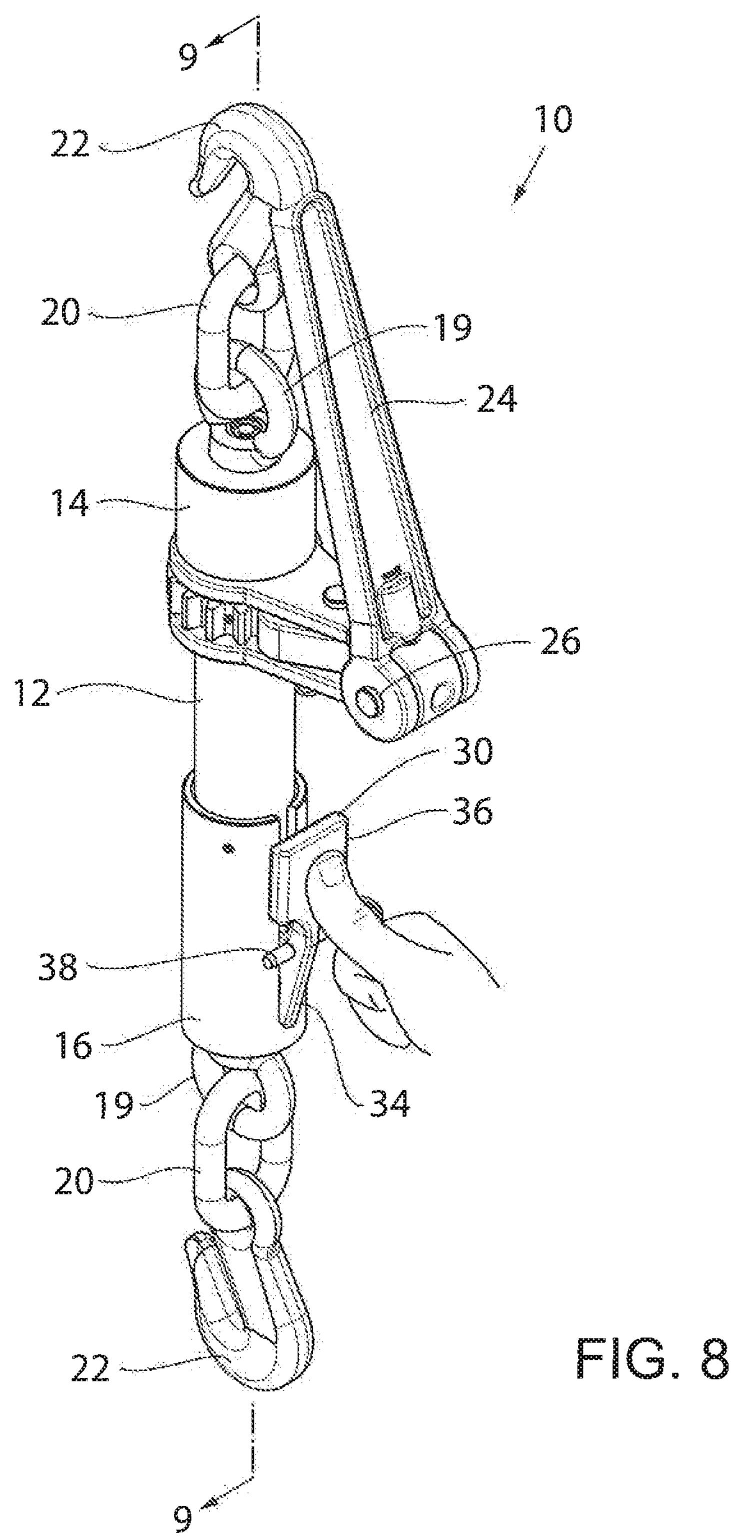
FIG. 8 is a perspective view of the ratcheting chain binder with the lever is a second position.
Figure 9:
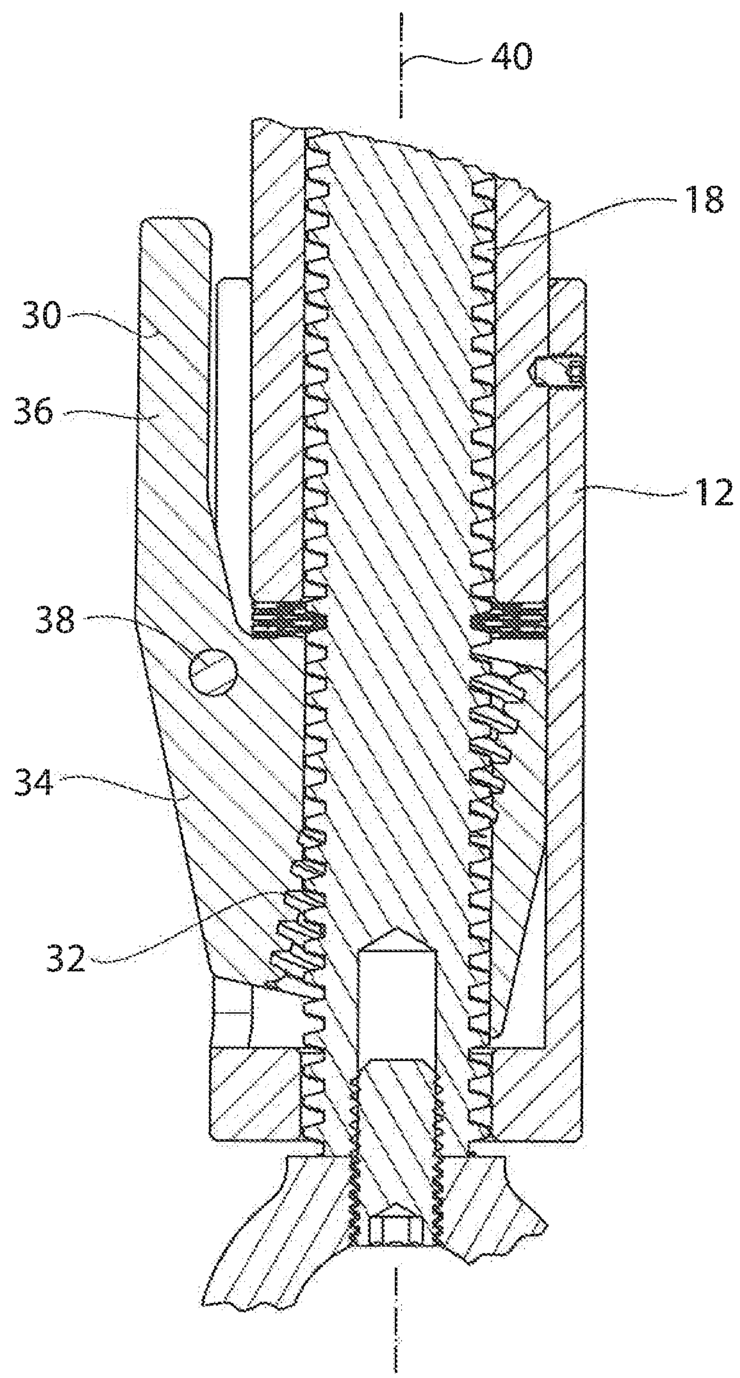
FIG. 9 is a sectional view taken along line C-C of FIG. 8 with the lever in the second position.

In operation and as shown in FIGS. 1 and 7, the lever 30 is in its first position. As shown in FIGS. 8 and 9, when the chain binder 10 is to be used, a user depresses the pad 36 on the lever 30 thus disengaging the teeth 32 from the threads 18. The user can then move the body 12 longitudinally along the axis 40 to a desired position, up to a fully extended position, before releasing the lever 30 back to its first position where the teeth 32 engage the threads 18 and do not allow any longitudinal movement.

Figure 10:
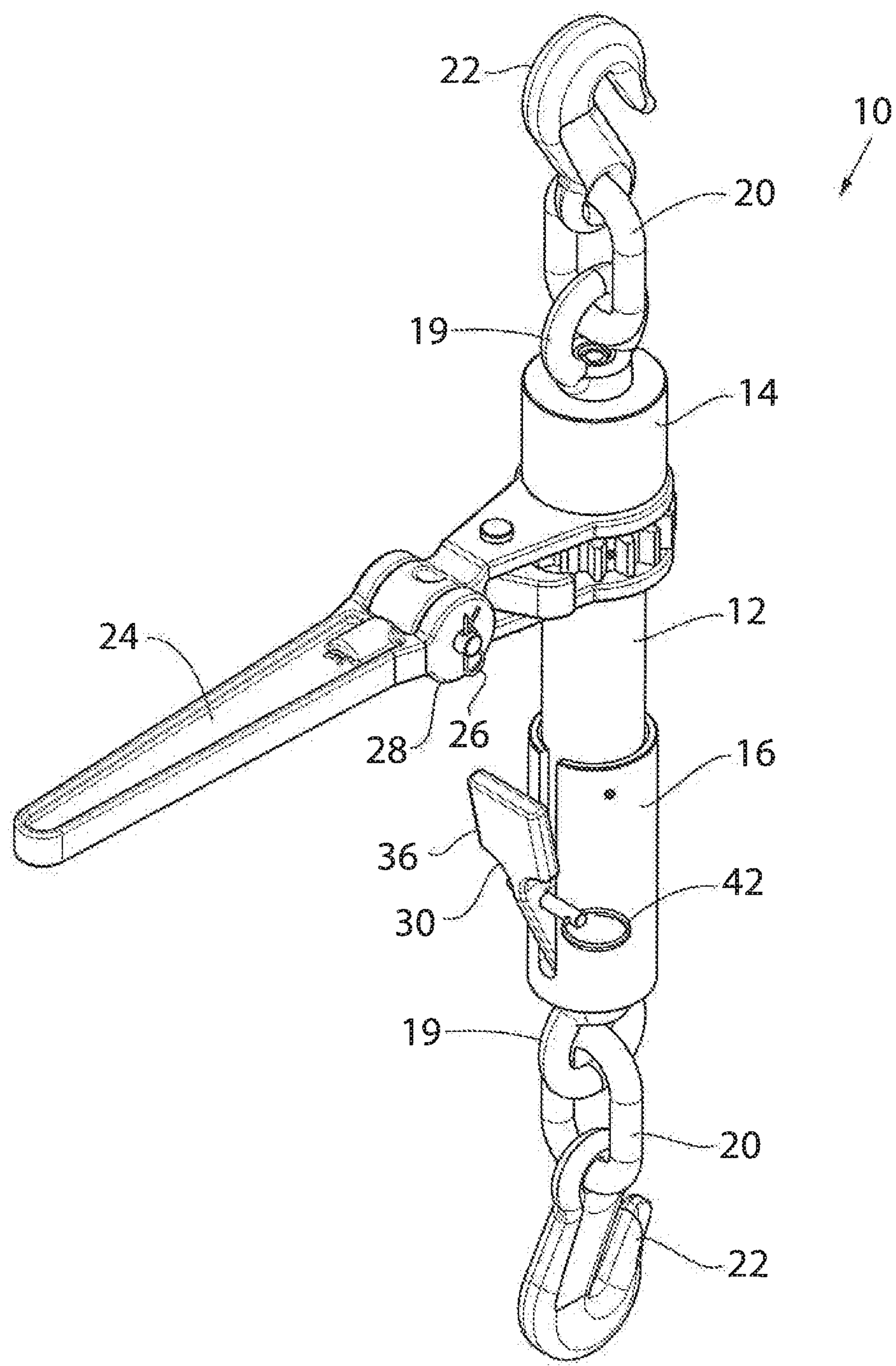
FIG. 10 is a perspective view of the ratcheting chain binder.

As shown in FIG. 10, when the handle 24 is to be used to ratchet and tighten a load, the handle 24 is in its use position which is generally perpendicular to the body 12.

Various features and advantages of the invention are set forth in the following claims.

What is claimed is:

1. A ratcheting chain binder comprising:
- a rotatable body having thereon threads;
- at least one hook;
- a ratcheting handle for providing a ratcheting action; and
- a thread release having at least one tooth, having a first position wherein the at least one tooth engages the threads and having a second position wherein the at least one tooth does not engage the threads.

2. The ratcheting chain binder of claim 1 wherein the thread release is a user depressible lever.

3. The ratcheting chain binder of claim 1 wherein the thread release is one of a user depressible button and a moveable slide.

4. The ratcheting chain binder of claim 1 wherein the ratcheting handle is pivotable between a use and a storage position.

5. The ratcheting chain binder of claim 1 and further including a lock adapted to prevent the release from inadvertently being move to the second position.

6. The ratcheting chain binder of claim 1 wherein the release is adapted to be moved by a user from the first to the second position.

7. The ratcheting chain binder of claim 1 wherein the release is pivotable between the first position and the second position.

8. The ratcheting chain binder of claim 1 wherein the release is incapable of being in the second position when there is a load on the binder.

9. A ratcheting chain binder comprising:
- an axially rotatable body having two ends and threads thereon;
- a hook secured to each end of the body;
- a ratcheting handle for providing a ratcheting action; and
- a thread release having teeth and having a first position wherein the teeth engage the threads to prevent axial motion of the body and a second position wherein the teeth do not engage the threads to allow axial motion of the body.

10. The ratcheting chain binder of claim 9 and further including a lock adapted to prevent the release from inadvertently being moved to the second position.

11. The ratcheting chain binder of claim 9 wherein the release is a lever.

12. The ratcheting chain binder of claim 9 wherein the teeth are release pivotally move from the first position to the second position.

13. The ratcheting chain binder of claim 9 wherein the release includes a user depressible pad adapted for a user to move the release to the second position.

14. The ratcheting chain binder of claim 9 wherein the release is adapted to be moved by a user from the first to the second position.

15. The ratcheting chain binder of claim 9 wherein the ratcheting handle is moveable between a use position and a storage position and is positioned closer to one of the two ends of the body.

16. A ratcheting chain binder comprising:
- an axially rotatable body having two ends and threads therebetween;
- a chain extending from each end of the body;
- a hook extending from each chain;
- a ratcheting handle for providing a ratcheting action having a use position and a storage position; and
- a lever pivotably secured to the body and having thereon teeth and a user pad, the user pad adapted to be depressible by a user to move the lever from a first position wherein the teeth engage the threads and prevent axial motion of the body to a second position wherein the teeth do not engage the threads allowing axial motion of the body to another position.

17. The ratcheting chain binder of claim 16 and further including a lock adapted to prevent the level from inadvertently being move to the second position.

18. The ratcheting chain binder of claim 16 wherein the lever cannot be moved to the second position when there is a load on the binder.

19. The ratcheting chain binder of claim 16 wherein the handle is positioned closer to one of the two ends of the body.

20. The ratcheting chain binder of claim 16 wherein the another position is a fully extended position.

* * * * *